United States Patent [19]

Kramer

[11] 4,239,326
[45] Dec. 16, 1980

[54] HOLOGRAPHIC SCANNER FOR RECONSTRUCTING A SCANNING LIGHT SPOT INSENSITIVE TO A MECHANICAL WOBBLE

[75] Inventor: Charles J. Kramer, Pittsford, N.Y.

[73] Assignee: Xerox Corporation, Stamford, Conn.

[21] Appl. No.: 708,245

[22] Filed: Jul. 23, 1976

[51] Int. Cl.³ ............................................. G02B 27/17
[52] U.S. Cl. .................................. 350/3.71; 350/3.79; 350/3.85; 350/6.3
[58] Field of Search ....................... 350/6, 7, 3.5, 3.70, 350/3.71, 3.75, 3.78, 3.79, 3.85, 3.86, 6.2, 6.3, 6.5, 6.7

[56] References Cited

U.S. PATENT DOCUMENTS

| | | | |
|---|---|---|---|
| 3,614,193 | 10/1971 | Beiser | 350/7 |
| 3,619,033 | 11/1971 | McMahon | 350/3.5 X |
| 3,721,487 | 3/1973 | Pieuchard et al. | 350/7 |
| 3,795,768 | 3/1974 | Locke | 350/3.5 X |
| 3,953,105 | 4/1976 | Ih | 350/7 |

OTHER PUBLICATIONS

Cindrich, *Applied Optics*, Vol. 6, No. 9, Sep. 1967, pp. 1531-1534.
McMahon et al., *Applied Optics*, Vol. 8, No. 2, Feb. 1969, pp. 399-402.
Bryngdahl et al., *Applied Optics*, Vol. 15, No. 1, Jan. 1976, pp. 183-194.
Hu et al., *Applied Optics*, Vol. 15, No. 6, pp. 1558-1564, Jun. 1976.
Bartolini et al., "Embossed Hologram Motion Pictures for Television Playback," *Applied Optics*, Vol. 9, No. 10, Oct. 1970, pp. 2283-2290.

*Primary Examiner*—John K. Corbin
*Assistant Examiner*—John D. Lee

[57] ABSTRACT

A holographic spinner reconstructs a light spot to rapidly scan a narrow line on a suitable "write" surface to generate an image. The geometry of the holographic spinner with respect to the holographic reconstruction light beam is such that the position of the regenerated light spot is insensitive to mechanical wobble which might be present in the spinner mechanism.

1 Claim, 5 Drawing Figures

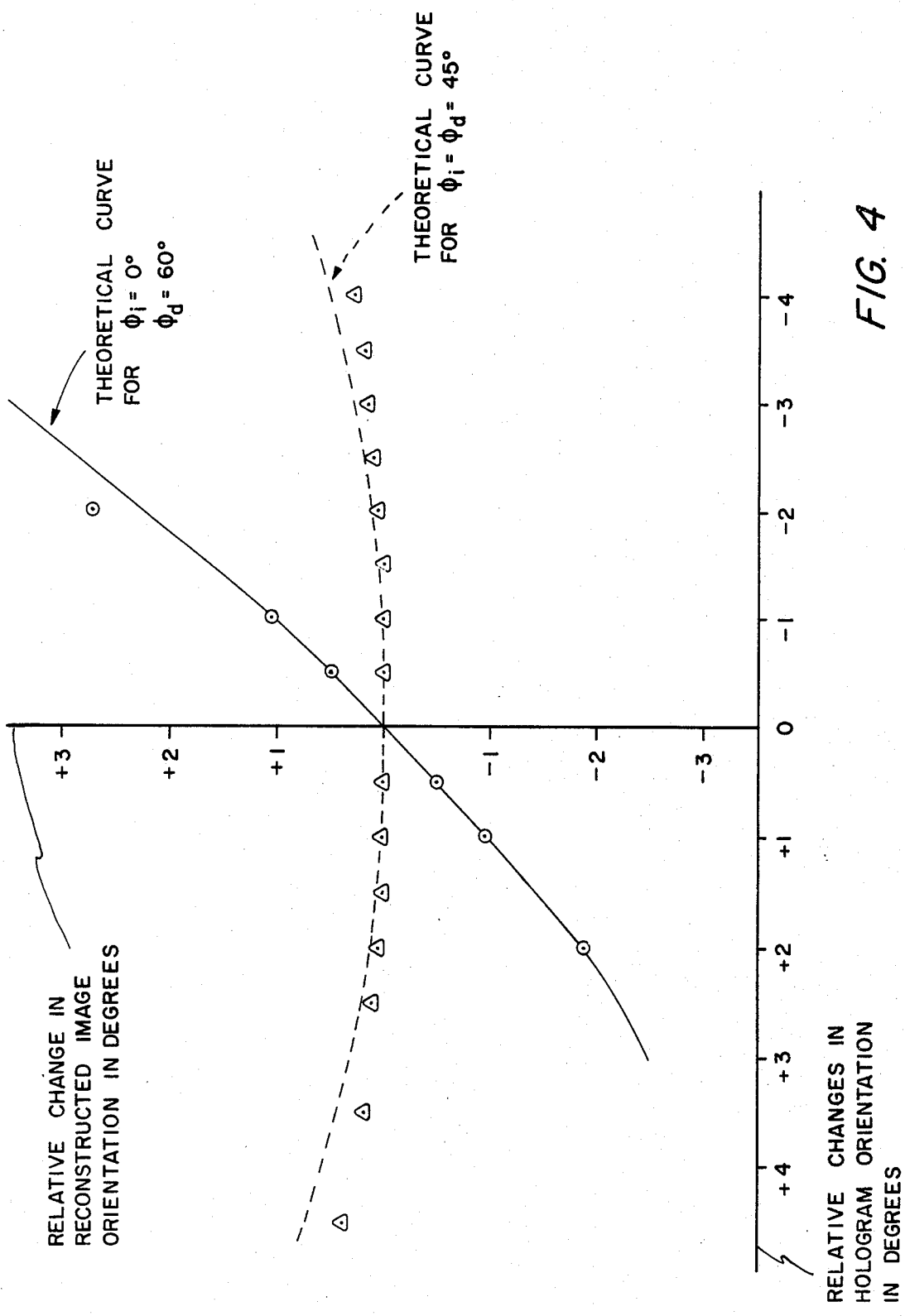

HOLOGRAPHIC SCANNER FOR RECONSTRUCTING A SCANNING LIGHT SPOT INSENSITIVE TO A MECHANICAL WOBBLE

BACKGROUND OF THE INVENTION

This invention relates to light spot scanning, and more particularly to scanning with a spot of light generated holographically.

The primary function of a scanning system is the controlled sampling, or restoration, of information. In an optical scanning system, the information is processed either in parallel by a light beam which can simultaneouslsy illuminate many data sites, or sequentially by a beam which, due to its size, illuminates only a single data site at a time. Interest in sequential optical scanning has expanded in recent years, primarily because of new capabilities provided by laser light. Laser scanners are capable of generating high resolution images at high scan rates. Most of the scanning systems devised to manipulate a laser beam include a galvanometer, rotating mirror, acousto-optic element, or electro-optic element as the light deflector. It was first demonstrated in 1967 that a rotating hologram can also serve as a deflector element in an image scanning system.

Laser line scanners used for imaging applications are generally required to generate a repetitive single scan line. A problem which has been encountered with multi-faceted rotating mirror line scanners is that due to the facet-to-facet nonuniformities and spinner wobble, noncollinear multiple scan lines are formed. An obvious solution to this problem is to fabricate the spinner assembly to such precise mechanical and optical tolerances that the residual error does not detract from the desired level of image quality. The expense of this approach, however, is a decided disadvantage. Holographic scanning provides an alternative by which this problem can be minimized.

In a typical arrangement for making a flat holographic spinner, a point light source serves as the object and a normally incident plane light wave as the reference beam. When a hologram thus constructed is illuminated with a plane light wave which is the inverse of the original reference beam, the hologram functions to reconstruct the original propagating wavefront which converges to form an image of the original point light source. When the holographic spinner is then rotated about the axis of the reference beam, the reconstructed image spot scans a circle in space.

It is an object of this invention to provide a holographic scanner which is insensitive to mechanical wobble during rotation.

Another object is to provide a general method of fabricating a holographic scanner which is essentially insensitive or invariant with respect to mechanical wobble.

Other objects, advantages, and features of this invention may become apparent from the following more detailed description given in connection with the accompanying drawing.

DRAWING

FIG. 4 is a curve showing angular deviation of the reconstructed image as a function of angular deviation of the hologram.

DESCRIPTION

Figure 1:
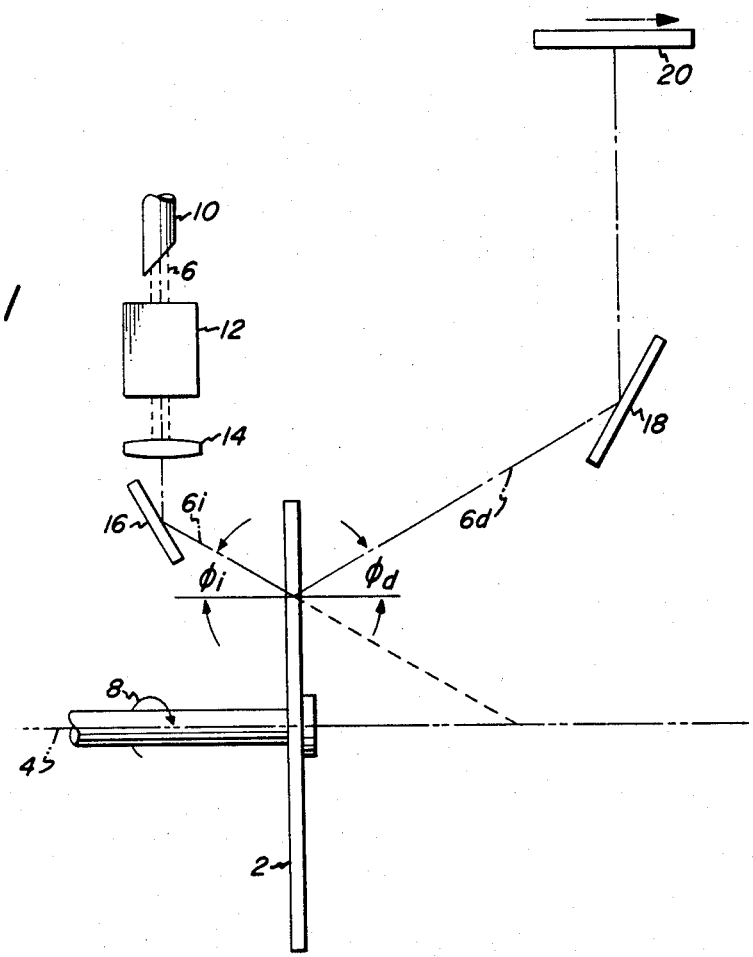
FIG. 1 is a schematic illustration of a scanning system in which a holographic spinner is used to generate a scanning spot of light.

Referring now to FIG. 1, a holographic spinner is shown at 2 mounted for rotation on a shaft 4. The holographic spinner 2 is a transmission-type hologram and disposed in the path of a reconstruction light beam 6 which, after transmission through the hologram, is a reconstruction of the original interfering light wave front to which the hologram was originally exposed. The hologram was originally exposed to interfering object and reference beams, the object beam emanating from a point source of light. Thus, the hologram contains information for the reconstruction of the point source and the locus of this reconstructed point source as the holographic spinner is spun on the axis 4 is a circle in space. The spinner 2 can be sectioned into a plurality of holographic facets which are analogous to the several facets of a polygon mirror scanner. It is known in the art of holography that repeated exposures can increase the density of information contained in the hologram. This is not material to the present invention but is mentioned here since it may be preferred to generate simultaneously a plurality of scanning light spots.

Holographic spinner 2 is driven by a suitable motor, not shown but indicated by the arrow 8.

Reconstruction light beam 6 emanates from a laser or other source of coherent light 10. A modulator 12 is disposed in the path of light beam 6 to provide the desired modulation to the light beam for the purpose of "writing" with the scanning light spot. A lens 14 and reflector 16 are provided to control the light beam 6 and direct it as desired onto the holographic spinner. Light beam 6 is represented only by its principal ray, incident upon the holographic spinner at an angle $\phi_d$. The holographic spinner diffracts the light beam 6 at an angle of diffraction $\phi_d$. A reflector 18 directs the light from hologram 2 and the light spot generated by the hologram to a scan surface 20 which may be a Xerographic plate or some other photosensitive surface. Surface 20 is represented as moving in a direction normal to the direction of scan by the light spot to effect raster scanning over the two-dimensional surface.

Figure 2:
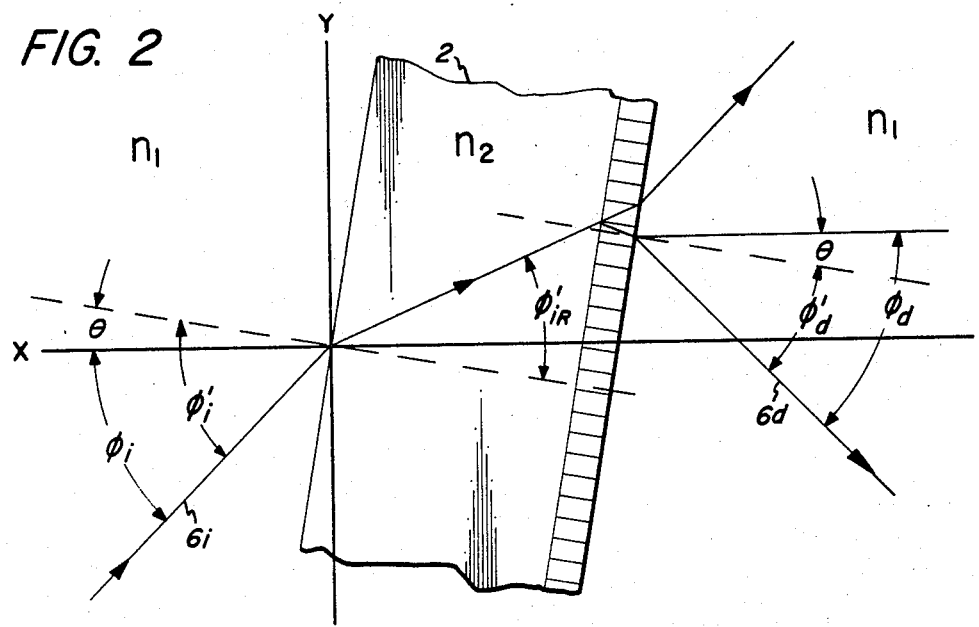
FIG. 2 is an enlarged representation of the spatial geometry of a hologram relative to incident and diffracted light rays.

In order to evaluate how the angular direction of a diffracted ray from a hologram is affected by tilting the hologram, the directions of both refracted and diffracted light rays traversing the hologram are to be considered. Illustrated in FIG. 2 is an enlarged cross section of a hologram which is tilted by an angle $\theta$ with respect to fixed X-Y coordinates in space. It will be assumed that the hologram was originally formed so that the normal to its surfaces (shown as a dashed line in FIG. 2) was parallel to the X axis and, therefore, $\phi_i$ and $\phi_d$ are respectively the angles that the reference and object light waves made with the hologram during its exposure or recording process.

It is worthwhile at this point to define how the different angles which will be used in the following derivation are measured. The notation conventions which will be observed here are: The subscripts i and d refer to incident and diffracted light waves respectively; the subscript R means that the parameter to which it is connected is measured within the holographic medium; the index $n_1$ is the assumed refractive index of the medium, such as air in which the hologram is disposed; the index $n_2$ is the assumed refractive index of the holographic medium; variables noted with a prime superscript (eg. $\phi'$) mean that they are measured with respect to the hologram normal, whereas unprimed variables are measured with respect to the fixed X-Y coordinates.

Two basic equations are now the starting points of this derivation: Snell's Law $$n_1 \sin \phi_1 = n_2 \sin \phi_2 \qquad (1)$$

and the grating equation $$\sin \phi_i + \sin \phi_d = \lambda/d \qquad (2)$$

where $\lambda$ is the light wavelength and $d$ the grating period. For the first input surface we have:

$$n_1 \sin \phi_i' = n_2 \sin \phi_{iR}' \qquad (3)$$

and since $\phi_i' = \phi_i + \theta$, this equation can be rewritten as:

$$n_1 \sin(\phi_i + \theta) = n_2 \sin \phi_{iR}' \qquad (4)$$

The change in $\phi_{iR}'$ due to the tilt angle $\theta$ is calculated by differentiating Equation (4) with respect to $\theta$:

$$\frac{d\phi_{iR}'}{d\theta} = \frac{n_1 \cos(\phi_i + \theta)}{n_2 \cos \phi_{iR}'} \qquad (5)$$

At the grating plane interface we have:

$$\sin \phi_{iR}' + \sin \phi_{dR}' = \frac{\lambda}{n_2 d} \qquad (6)$$

$\phi_{dR}'$ is not indicated in FIG. 2 but is the diffraction angle measured in the holographic medium with respect to the hologram normal.

The change in $\phi_{dR}'$ to the tilt angle is:

$$\frac{d\phi_{dR}'}{d\theta} = \frac{-\cos \phi_{iR}'}{\cos \phi_{dR}'} \frac{d\phi_{iR}'}{d\theta} \qquad (7)$$

Substituting from Equation (5) gives:

$$\frac{d\phi_{dR}'}{d\theta} = \frac{-n_1}{n_2} \frac{\cos(\phi_i + \theta)}{\cos \phi_{dR}'} \qquad (8)$$

At the last surface we have:

$$n_2 \sin \phi_{dR}' = n_1 \sin \phi_d \qquad (9)$$

Differentiating this equation with respect to $\theta$ gives:

$$\frac{d\phi_d'}{d\theta} = \frac{n_2}{n_1} \frac{\cos \phi_{dR}'}{\cos \phi_d'} \frac{d\phi_{dR}'}{d\theta} \qquad (10)$$

Substituting from Equation (8) gives:

$$\frac{d\phi_d'}{d\theta} = \frac{-\cos(\phi_i + \theta)}{\cos \phi_d'} \qquad (11)$$

The change in the angular direction of the diffracted beam with respect to the fixed X-Y coordinates is obtained with the following coordinate transfer:

$$\phi_d' = \phi_d - \theta \qquad (12)$$

Utilizing this equation, the desired result is obtained:

$$d\phi_d = \left[1 - \frac{\cos(\phi_i + \theta)}{\cos(\phi_d - \theta)}\right] d\theta \qquad (13)$$

It is apparent from Equation 13 that when $\phi_i = \phi_d$, $\phi_d$ does not change for small values of $\theta$. A holographic spinner, therefore, fabricated with $\phi_i = \phi_d$ will reconstruct an image whose position is invariant with respect to small tilt angles of the spinner.

To verify the validity of equation 13, two holograms were fabricated and the relative angular sensitivity of their reconstructed real image measured as a function of the tilt angle of the hologram. The first was fabricated to satisfy the invariant condition of equation 13, $\phi_i = \phi_d$. The second hologram was formed with $\phi_i = 0°$ and $\phi_d = 60°$, ie. a reference beam normally incident on the hologram.

Theoretical and experimental data for the two holograms investigated are given in the graph of FIG. 4. The horizontal axis of this graph represents the tilt angle $\theta$ of the hologram. The vertical axis is the relative change, $d\phi_d$, in the angular orientation of the reconstructed image or light spot. The experimental data points for the hologram with $\phi_i = \phi_d = 45°$ are represented by the triangles, while the data for the hologram with $\phi_i = 0°$ and $\phi_d = 60°$ are represented by circles. The theoretical curves are respectively labeled. The close correspondence between the theoretical and experimental data attests to the validity of equation 13. Briefly, the graph points out that the deviation of the reconstructed image or light spot is practically nil through a tilt of the hologram of plus or minus 4° when $\phi_i = \phi_d$. By comparison, there is a one-to-one relationship between hologram tilt and image deviation where $\phi_i = 0°$ and $\phi_d = 60°$.

The principle of the invariant holographic image, demonstrated above, finds practical application in a holographic scanner as represented in FIG. 1. The holographic spinner which reconstructs a light spot that will stay in its desired scan locus despite a small wobble or tilt in the spinner will have decided advantages.

Figure 3:
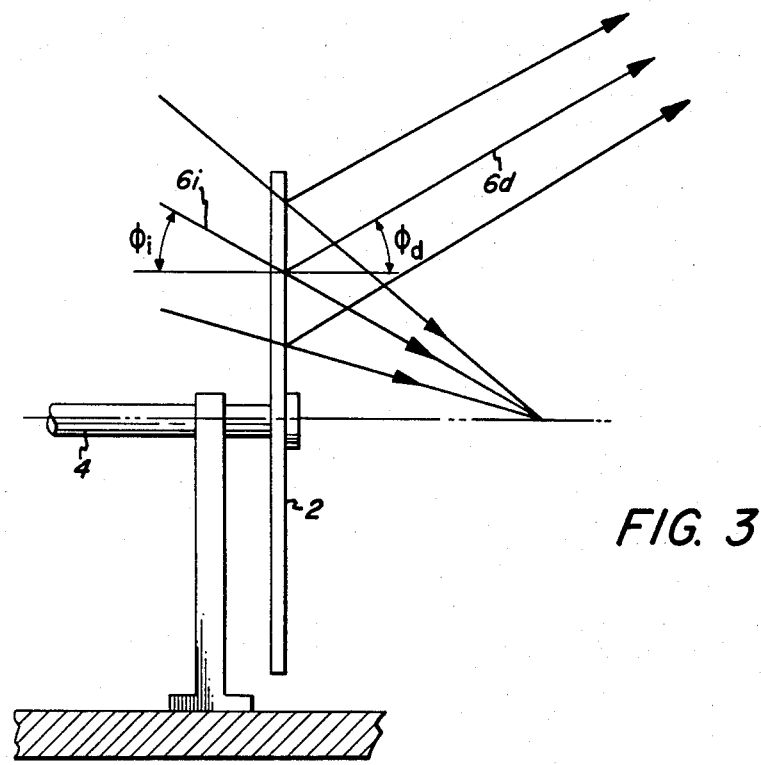
FIG. 3 shows a part of the system of FIG. 1, somewhat enlarged, representing the holographic reconstruction process.

As has been developed above, the first constraint on the reconstruction wavefront 6 is that it be directed so that $\phi_i = \phi_d$. The other major constraint upon the reconstruction wavefront 6 is that it be essentially radially symmetrical relative to the axis of rotation of the holographic spinner 2. This constraint arises as a requirement to minimize aberrations at every point in the scan field of interest. A collimated reconstruction beam which is normally incident on a flat holographic spinner clearly satisfies the symmetry requirement since it has a spatial phase variation at the spinner which is independent of rotation of the spinner. By the same reasoning, a reconstrucion wavefront which originated from a point on the axis of rotation of the spinner would also have a spatial phase variation on the spinner which is invariant with respect to its rotation. FIG. 3 schematically illustrates a reconstruction wavefront equivalent to one which originated on the axis of rotation of the spinner 2. In FIG. 3, the reconstruction wave 6 is depicted as converging to a point on the axis 4, which from a symmetry standpoint is equivalent to a wave which originates from that axial point. The incident convergent wavefront 6i of FIG. 3 is the same light beam 6i shown in FIG. 1, having been caused to converge by lens 14.

In the system shown in FIG. 3, only the principal ray exactly satisfies the invariant condition. A tilting of the hologram does not change the angular direction of the diffracted beam from the scanner of FIG. 3, but does introduce a degree of astigmatic aberration into the beam. For positive tilt angles, the tangential rays come to focus behind the sagittal rays while for negative tilt angles, the tangential rays come to focus before the sagittal rays.

Figure 5:
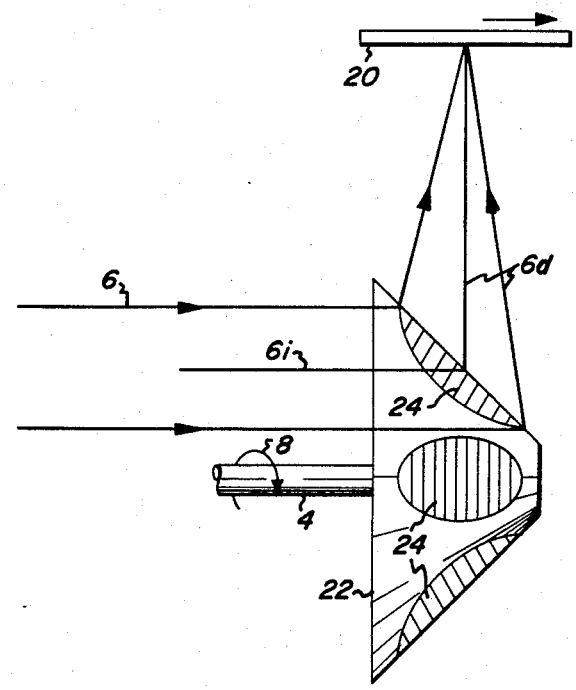
FIG. 5 is a schematic illustration of an alternate embodiment of this invention.

An alternative embodiment of this invention is represented in FIG. 5 in which a conically shaped holographic spinner 22 is disposed for rotation on the shaft 4 and in the path of a reconstruction light beam 6. A plurality of holographic facets are shown at 24. A feature of this arrangement is that the reconstruction beam 6 can be a collimated beam, and parallel to the axis of the system as shown, whereas in the arrangements of FIGS. 1 and 3, it is necessary to take the additional measures to make the reconstruction beam the equivalent of one having originated on the axis of the system.

The present invention can be summarized by the following two properties. First is a hologram providing an invariant condition, in which a holographically reconstructed light spot is not subject to perturbations despite mechanical wobble of the hologram. This results when $\phi_i = \phi_d$. Second the radially symmetrical illumination of such a hologram by a reconstruction wavefront, while spinning, produces a desired substantially aberration-free spot scan of the reconstructed light spot.

The present invention permits construction of holographic spinner-scanners that are less sensitive to mechanical wobble in the spinner by over a factor of 10 as compared to typical flat spinner designs in which the reference and reconstruction light beams are normally incident on the hologram, $\phi_i = 0°$ and $\phi_d = $ some other angle. The practical result of this is that a spinner constructed according to this invention, even if it should experience some small amount of wobble, will produce a satisfactory line image for most imaging applications without the use of additional corrector optics.

The foregoing description of this invention is given by way of illustration and not of limitation. The concept and scope of the invention are limited only by the following claims and equivalents thereof which may occur to others skilled in the art.

What is claimed is:

1. A holographic raster scanning system including:
   a source of coherent light,
   a hologram disposed in the path of a reconstruction light wavefront and a principal light ray thereof from said source and mounted for rotation to effect the transverse movement of said hologram relative to said wavefront and said principal light ray,
   said hologram effective to transmit said wavefront and said principal light ray, incident thereon at an angle of incidence $\phi_i$, and to diffract said principal ray at a first order diffraction angle $\phi_d$, to reconstruct an image wavefront forming a spot of light for scanning when said hologram is rotated,
   said hologram being disposed relative to said principal light ray such that said angles of incidence and diffraction are substantially equal,
   said wavefront and said hologram being further disposed so that said wavefront is substantially radially symmetrical relative to the axis of rotation of said hologram, said symmetry being achieved by directing said wavefront so that its apparent, or real, origin is a point on said hologram axis of rotation
   whereby the reconstructed image wavefront propagating from said hologram and the projected spot of light are substantially invariant in the presence of varying degrees of tilt of said hologram relative to said principal light ray when said hologram is rotating.

* * * * *

UNITED STATES PATENT AND TRADEMARK OFFICE
CERTIFICATE OF CORRECTION

PATENT NO. : 4,239,326
DATED : December 16, 1980
INVENTOR(S) : Charles J. Kramer It is certified that error appears in the above—identified patent and that said Letters Patent is hereby corrected as shown below:

Column 2, line 45, change "$\phi_d$" to --$\phi_i$--.

Column 3, line 44, change "$\phi dR'$" to --$\phi'_{dR}$--.

Column 3, line 47, change "$\phi_{dR'}$" to --$\phi'_{dR}$--.

Column 3, line 60, change entire equation to read

--$n_2 \sin \phi'_{dR} = n_1 \sin \phi'_d$--.

Signed and Sealed this

Second Day of June 1981

[SEAL]

Attest:

RENE D. TEGTMEYER

Attesting Officer

Acting Commissioner of Patents and Trademarks